Figure 1:
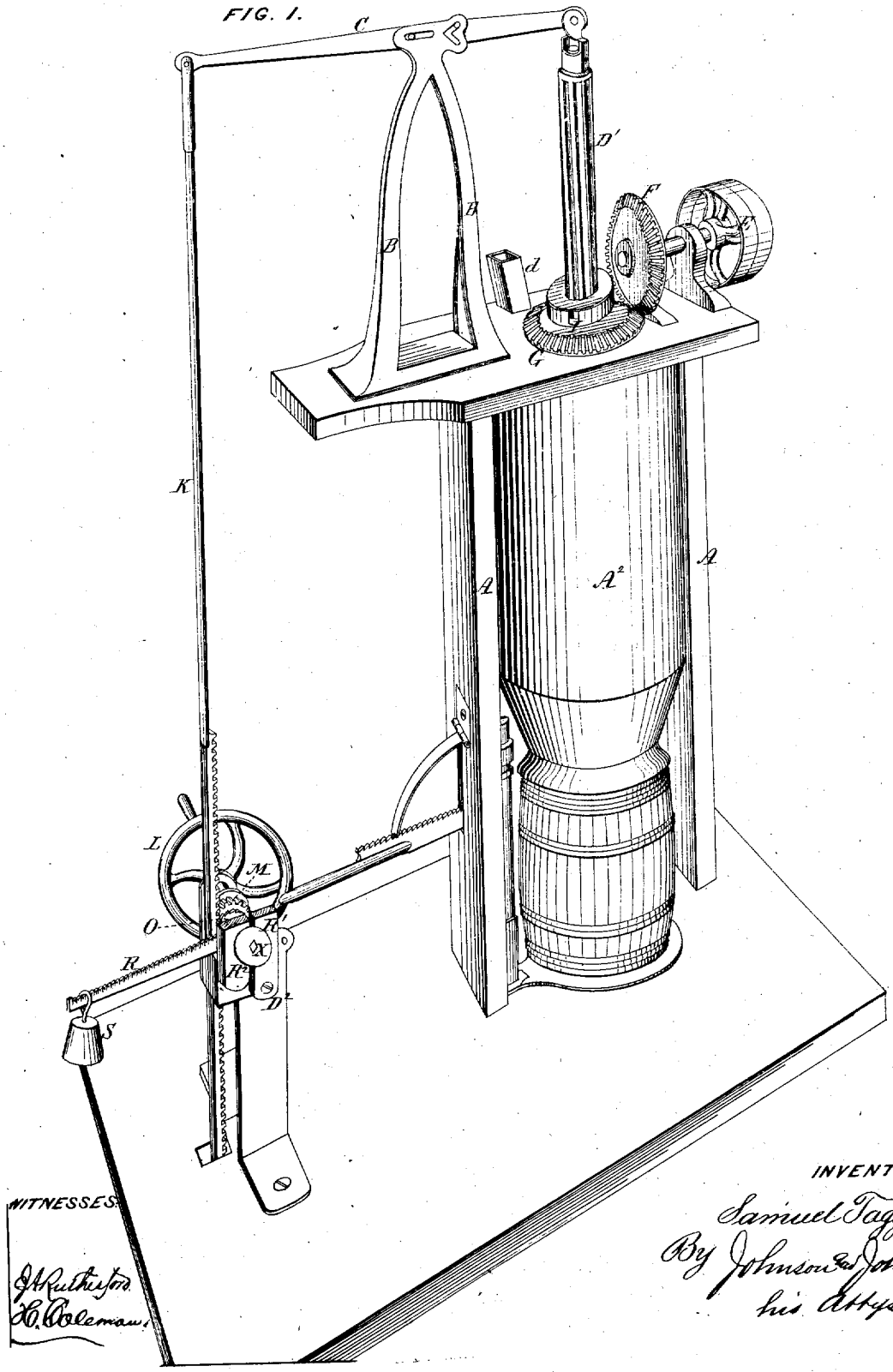

S. TAGGART.

Flour-Packers.

No. 6,041. Reissued Sept. 1, 1874.

WITNESSES:

J. H. Rutherford
H. Coleman.

INVENTOR:

Samuel Taggart
By Johnson & Johnson
his Attys.

S. TAGGART.
Flour-Packers.
No. 6,041. Reissued Sept. 1, 1874.
FIG. IV.
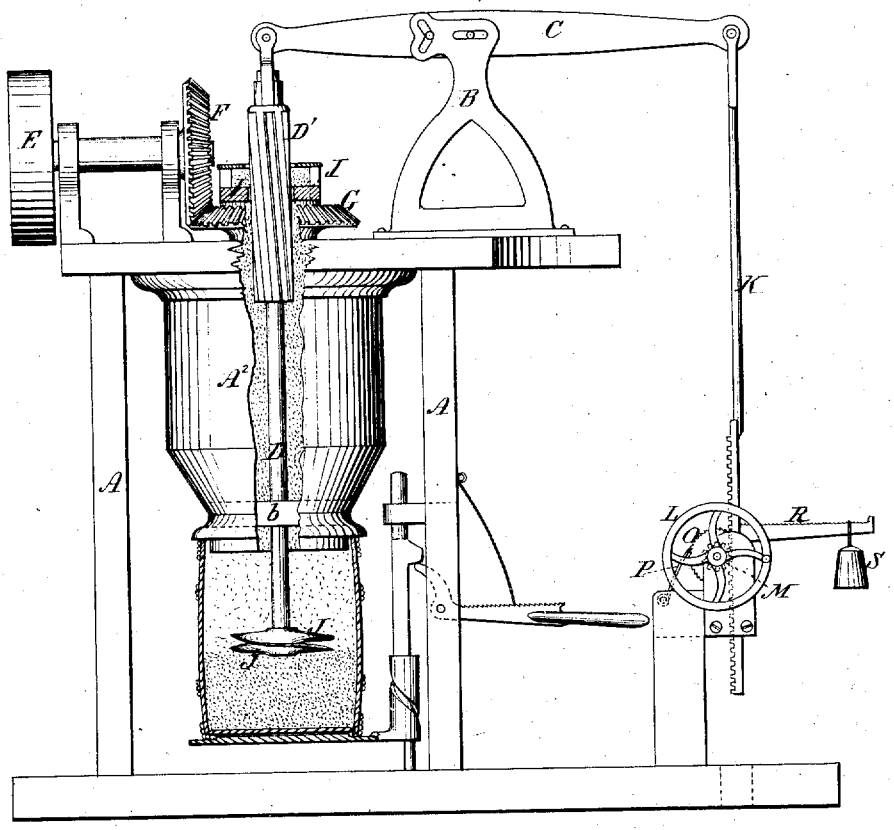
FIG. II.
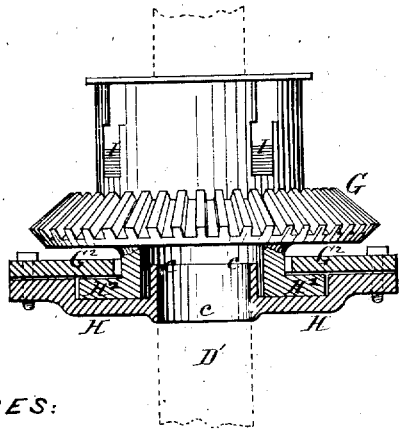
FIG. III.
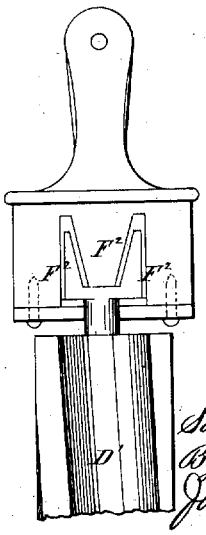
WITNESSES:
Jas. A. Rutherford
Harry Coleman
INVENTOR:
Samuel Taggart
By Johnson & Johnson
his Att'ys

UNITED STATES PATENT OFFICE.

SAMUEL TAGGART, OF INDIANAPOLIS, INDIANA.

IMPROVEMENT IN FLOUR-PACKERS.

Specification forming part of Letters Patent No. 24,963, dated August 2, 1859; reissue No. 4,626, dated November 7, 1871; extended seven years; reissue No. 6,041, dated September 1, 1874; application filed August 19, 1874.

*To all whom it may concern:*

Be it known that I, SAMUEL TAGGART, of Indianapolis, in the county of Marion and State of Indiana, have invented certain new and useful Improvements in Flour-Packers, of which the following is a full and exact description, reference being had to the accompanying drawings and to the letters of reference marked thereon.

Figure 1 represents a perspective view, showing the construction and general arrangement of a portable flour-packer and the combination therewith of an adjustable friction-brake, by means of which the pressure of said auger upon the flour is controlled during the operation of packing; Fig. 2, a sectional view of the clutch-wheel detached, showing, in section, the construction and arrangement of the bearing thereof, together with the lubricating device and the bearing therein for the vertical packing-shaft, to which the auger or packing-blades are attached. Fig. 3 represents, in section, the suspension-bearing, by which the upper end of the packing-shaft is connected with one end of a walking-beam or lever, the latter being connected by its other end with the friction-brake, by which the pressure of the auger upon the flour in the process of packing is controlled, and also showing the mode of lubricating the same; and Fig. 4, a side elevation of the machine, showing the barrel in section and a part of the flour-chest cut away to show the packing-shaft and auger.

This invention relates to what is known as the auger-packer—that is, spiral blades or wings, with balancing issues fixed on or near the lower end of a vertical rotating shaft, by means of which the flour is packed or pressed into barrels or other receptacles; and my invention in such packer consists in the construction, combination, and arrangement of devices, hereinafter named and described, by which the packer is rendered compact and portable, and which may be constructed in the shop as an article of manufacture, and transported to and set up in a flouring-mill without material alteration of the latter, and is designed to take the place, especially in small mills, of the cumbersome and expensive stationary packers heretofore in use.

As the chief object of my invention was to reduce the packer within the least practicable dimensions, and at the same time retain, or possibly increase, its packing capacity, my first efforts were directed to means by which to so control the pressure of the auger upon the flour that the requisite quantity (one hundred and ninety-six pounds) might be readily packed into suitable barrels, even of varying size. This I accomplished by means of a friction-brake, combined for action with the auger in a manner that the pressure upon the flour being packed is under perfect control.

The parts incidental in carrying out this combination will be described hereafter, as showing one mode of connecting the parts so combined, by which the pressure upon the flour as it is being packed may be controlled, as stated.

A A is the frame-work, to which is attached all the other parts of the packer. B is a standard on the upper plate or cap of the frame, in which the lever or walking-beam C is pivoted for a fulcrum, and which operates the packing-shaft. D $D^1$ is the packing-shaft, on the lower end of which the auger or packing-blades are fixed. The upper end of the packing-shaft is hung by a swivel-bearing to one end of the lever or walking-beam C, and the other end of said lever is connected with the friction-brake by means of the rod K, which is provided with a cogged bar at its lower end, which, matching with a cog-pinion, M, on the shaft of the friction-drum X, forms the connection between the auger and the brake, by which the desired pressure of the auger upon the flour is obtained. E is a pulley, which may be connected by belt with any suitable driving part of the mill machinery. F is a bevel-wheel on the same shaft with pulley E, and which gears with the horizontal bevel-wheel G, the latter having a clutch-plate, I, in its upper part, through which the wings of the upper part, $D^1$, of the packing-shaft pass, and by which the clutch-connection is obtained, which imparts a revolving motion to the auger-shaft. The ribs or wings $D^1$ serve as levers upon the clutch-plate to revolve the shaft, and these ribs fit into recesses in said clutch-plate, to allow the packing-shaft to be raised and lowered while it is also revolved, and thus causes the substance as it falls from the reservoir or chest $A^2$ to recede from the flat surface of the blades while being packed in the barrel. The flour, falling upon the auger J J as it revolves rapidly, is laid in thin layers under the pressure or force applied by the friction-brake. The clutch-wheel G has its bearing centered within a boxing formed by the casting H, as shown in Fig. 2, which also serves as an oil-cup, to keep the bearing constantly lubricated. $G^2$ is a plate, made in halves, and bolted to the box or bearing-plate H, to secure all together, and especially the holding-flange $H^2$ of the clutch-wheel.

It will be seen, by reference to Fig. 2, that, by means of the wheel G furnished with the clutch-plate I, and having its bearing in the oil-cup H, the central part *c* of which is so formed as to constitute a bearing for and support in an upright and central position the packing-shaft D $D^1$, that the latter may have a vertical movement, so as to be lowered into the barrel, and automatically rise as the flour is packed into it, the resistance to rise, and consequently the pressure of the auger upon the flour, being controlled by the friction-brake. The friction-brake is composed of a friction drum or pulley, X, hand-wheel L, pinion M, and ratchet-wheel O, all fixed on the same shaft, which is mounted in suitable bearings, and levers or brake-clamps $R^1$ $R^2$ and ratchet-pawl P. The ratchet-wheel O and pawl P are designed to keep the packing-shaft and auger from dropping down by their own weight when the packed barrel is removed, and the hand-wheel L is designed as a convenient means of lowering the auger into the empty barrel, the pawl P being disengaged from the ratchet-wheel O for this purpose. The brake-blocks $R^1$ $R^2$ are arranged to nearly surround or embrace the friction-drum, one of these clamps, $R^1$, being pivoted at $D^2$ and having a lever, R, extending horizontally from its upper end, so as to clamp the drum X against the fixed jaw $R^2$. The force with which the clamps gripe the drum is regulated by means of a weight, S, hung upon the lever R. It is found more convenient to pack a little more than the requisite quantity of flour, so that by taking out a little of it the right quantity may be more readily determined. In the operation of the machine, the weight of the flour in the barrel is determined approximately by the weight of the brake, and then weighing the filled barrel upon scales. If there be too little flour in the barrel, I move the weight toward the end of the lever; if too much, the weight is moved toward the brake, the weight being only to regulate the pressure of the auger on the flour when packing; but in this way the brake is set so as to pack in every barrel one hundred and ninety-six (196) pounds, or a little over, rather than under, and then, in weighing on the flour-scales, the surplus is taken out of the barrel.

A very important advantage results from the combination of the hand-wheel with the friction-brake and packing-shaft, in enabling the attendant, in lowering the packing-auger into the barrel, to obtain the benefit of the partial action of the brake and thus prevent the too sudden descent of the shaft. The motion of the friction-drum, in lowering the auger, tends to open the jaws of the brake and thus relieve the friction very considerably, but the brake will still bite sufficiently upon the drum to overcome the weight of the packing-shaft to a degree that will effect and insure its safe descent to the bottom of the barrel, and thus greatly relieve the labor of the operator in this movement.

The top of the shaft D, as shown in Fig. 3, is constructed with an oil-cup, in which the bearing $F^2$ rests as the shaft D is revolved, by which arrangement a safety oil-cup is formed, insuring a good supply of oil without danger of greasing the packing-shaft and making the friction at the point of suspension very light. The use of the oil-cup H H, with the cap $G^2$ $G^2$ holding the flange $H^2$ $H^2$ of the clutch-wheel G, makes it unnecessary to have more than one bearing or journal for the clutch-wheel, and by the arrangement of two interior bearings, one, *c*, within the oil-cup of the clutch-wheel, and the other, *b*, at the bottom of the flour-tube, I am enabled to shorten the packing-shaft, dispense with the fixed bearings above the clutch-wheel, and place the whole machine in the single story of a mill without diminishing the capacity of the machine. The oil-reservoir and bearing for the clutch-wheel G is formed in a fixed plate, H, which also serves as a bearing for the packing-shaft, by having a tubular portion or sleeve, *c*, for that purpose. The horizontal bearing forms the oil-cup, and, being an annular chamber, forms also a centering-bearing for an annular flange on the clutch-wheel, and thus maintains its central position with the packing-shaft. The flour is fed into the feeding-tube through a spout, *d*.

I have shown one of the commonest forms of brakes, but it is obvious that any desired construction of variable weighting-brake may be used, so long as the results herein described are attained.

Having described my invention, I claim—

1. A portable auger packing-machine, having a short packing-shaft and a pressure-controlling brake, and the several parts constructed and arranged to occupy a single floor of a mill, instead of two or three stories, as heretofore, as described.

2. In a machine employing an auger for packing flour or other substances, the combination therewith of an adjustable friction-brake, by means of which the pressure upon the flour is controlled during the operation of packing.

3. The combination, substantially as described, of a packing-shaft and auger, with means for connecting it with a controllable brake, consisting of the lever C, connecting-rod K, and pinion M, as described.

4. In combination with a friction-weighted brake and a packing-shaft, the hand-wheel L, for controlling the descent of the packing-shaft into the barrel, as described.

5. The upper bearing for the packing-shaft and the bearing for the clutch-wheel, formed in one and the same fixed plate, as described.

6. The oil-chamber for the clutch-wheel, constructed and arranged to serve also as an annular centering-guide thereto, as described.

In testimony whereof I have hereunto set my hand this 12th day of August, A. D. 1874.

SAMUEL TAGGART.

Witnesses:

WM. SULLIVAN,

E. G. DAVIS.